United States Patent [19]

Hardman et al.

[11] 4,378,459

[45] Mar. 29, 1983

[54] ESTER FUNCTIONAL ORGANOPOLYSILOXANE LUBRICANTS AND PROCESS

[75] Inventors: Bruce B. Hardman; Frank J. Traver, both of Troy, N.Y.

[73] Assignee: General Electric Company, Waterford, N.Y.

[21] Appl. No.: 184,455

[22] Filed: Sep. 5, 1980

[51] Int. Cl.³ ............................. C07F 7/08; C07F 7/10
[52] U.S. Cl. ..................................... 556/439; 556/415; 556/416; 252/496
[58] Field of Search ........................ 556/439, 415, 416

[56] References Cited

U.S. PATENT DOCUMENTS

| | | | |
|---|---|---|---|
| 3,168,543 | 2/1965 | Black et al. | 556/439 |
| 3,441,585 | 4/1969 | Brown | 556/405 |
| 3,657,305 | 4/1972 | Morehouse | 556/439 X |
| 3,686,254 | 8/1972 | Morehouse | 556/439 X |
| 3,859,321 | 1/1975 | Traver | 556/439 X |
| 3,965,150 | 6/1976 | Moeller | 556/439 X |
| 4,081,410 | 3/1978 | Moeller | 556/439 X |

*Primary Examiner*—Paul F. Shaver

[57] ABSTRACT

Organopolysiloxane lubricant compositions comprising a polysiloxane chain containing silicon-bonded hydrocarbon radicals and silicon-bonded ester radicals. The ester functional organopolysiloxanes are obtained by reacting an allyl ester, by Si-olefin addition, with an organohydrogenpolysiloxane in the presence of a platinum catalyst.

7 Claims, No Drawings

ESTER FUNCTIONAL ORGANOPOLYSILOXANE LUBRICANTS AND PROCESS

This invention relates to new and improved organopolysiloxane fluids and, more particularly, to liquid organopolysiloxane lubricating compositions containing silicon-bonded ester radicals and to a new and improved process for preparing the same.

A variety of organopolysiloxane fluids have come into use to meet lubricating specifications for severe operating conditions encountered in both military and industrial equipment. These include the standard dimethyl polysiloxane fluids in which some of the methyl groups are substituted with phenyl and/or longer chain alkyl groups. However, many of these fluids are disadvantageous because they are immiscible with or incompatible with certain hydraulic fluids as, for example, those hydraulic fluids containing acrylate thickeners. Furthermore, many of the standard substituted polysiloxane fluids are expensive.

Accordingly, it is the principal object of the present invention to overcome the foregoing disadvantages.

It is another object of the present invention to provide organopolysiloxane fluids which can be used as lubricating fluids under severe operating conditions.

It is another object of the present invention to provide novel organopolysiloxane fluids which can be used as hydraulic fluids for central hydraulic systems.

It is yet another object of the present invention to provide an organopolysiloxane lubricant which is miscible with compositions containing organic acrylates and similar compounds.

It is still another object of the present invention to provide a process for preparing organopolysiloxane lubricating fluids.

SUMMARY OF THE INVENTION

These and other objects are accomplished by providing organopolysiloxanes having a polysiloxane chain containing silicon-bonded hydrocarbon radicals and silicon-bonded ester radicals. The present invention is based on the discovery of organopolysiloxanes consisting of a polysiloxane chain containing silicon-bonded hydrocarbon radicals and silicon-bonded ester radicals.

The ester functional organopolysiloxanes within the scope of the present invention can be characterized as having the formula:

$$(CH_3)_3SiO[R_2SiO]_x[(Q)SiR]_y[R'SiO_{1.5}]_zSi(CH_3)_3 \quad (1)$$

where R and R' are selected from the group consisting of monovalent hydrocarbon radicals, halogenated monovalent hydrocarbon radicals and cyanoalkyl radicals, x has a value of from 0 to about 100, y has a value of from 1 to about 100, z has a value of from 0 to about 5, and Q is an ester radical represented by the general formula:

$$-CH_2-CH_2-(CH_2)_p-C(O)O-(CH_2)_q-V$$

where the alkyl portion of the ester radical which bonds the C(O)O group to the organopolysiloxane chain comprises a straight chain or a branched chain, said branched chain having alkyl or aryl radicals attached thereto, and where p has a value of from 1 to about 30, q has a value of from 0 to about 10, and V is selected from the group consisting of:

$$-(OCH_2CH_2)_r-O-CH_3 \quad (a)$$

where r has a value of from 1 to about 10, $$-O-CH_3, \quad (b)$$

$$-CH_3 \quad (c)$$

where the alkyl group modified by q in the above ester radical comprises a straight chain or a branched chain, said branched chain having an alkoxy group attached thereto, $$-(CH_2-CH_2-O)_s-H \quad (d)$$

where s has a value of from 1 to about 30, and $$-(CH_2CH_2O)_t-(CH_2(CH_3)C(H)O)_uH \quad (e)$$

where t and u have a value of from 1 to about 20.

In preferred embodiments, R and R' contain less than 8 carbon atoms, and in particular, it is preferred that R be methyl or ethyl and R' be phenyl or a chlorosubstituted phenyl. Additionally, in preferred embodiments, the alkyl portion of the ester radical, which bonds the C(O)O group to the organopolysiloxane chain, is straight chained; p has a value of 8; q has a value of 2; and V is methoxy.

The ester functional organopolysiloxanes of the present invention are obtained by reacting a carboxylic acid having an allyl end group with an alcohol in the presence of an acid catalyst so as to esterify the acid. The resulting ester is then reacted by Si-olefin addition with an organohydrogenpolysiloxane in the presence of a platinum catalyst.

The ester functional organopolysiloxanes of the present invention have unexpectedly excellent lubricating properties which renders such compositions useful as "working" fluids. Such fluids offer similar lubricity properties found in current organopolysiloxane lubricants while affording a cost advantage. The polysiloxanes of this invention which contain methyl, octyl and 2-ethoxyhexylundecyl ester groups are miscible with compositions having organic acrylates which gives them compatability with certain hydraulic fluids including ones used in military applications and containing acrylate thickeners.

DETAILED DESCRIPTION OF THE INVENTION

The compositions within the scope of Formula (1) can be prepared by reacting organohydrogenpolysiloxanes having the general formula:

$$(CH_3)_3SiO[R_2SiO]_x[(H)SiR]_y[R'SiO_{1.5}]_zSi(CH_3)_3 \quad (2)$$

where R, R', x, y and z are previously described with allyl esters having the general formula:

$$CH_2=CH-(CH_2)_p-C(O)O-(CH_2)_q-V \quad (3)$$

where the alkyl portion of the ester which bonds the allyl group to the C(O)O group comprises a straight chain or a branched chain, said branched chain having alkyl or aryl radicals attached thereto, and where V, p and q are as previously described. The reaction is a straightforward addition of the allyl ester to the organohydrogenpolysiloxane chain in which the silicon-bonded hydrogen and the silicon to which it is bonded, are bonded to the carbon atoms which form the vinyl end of the allyl ester.

The organohydrogenpolysiloxanes of Formula (2) can be represented by one or more units of the general formula:

$$R''_a H_b SiO_{4-a-b/2}$$

where R'' is selected from the group consisting of monovalent hydrocarbon radicals, halogenated monovalent hydrocarbon radicals and cyanoalkyl radicals, and a varies from 1.11 to 2.02, b varies from 0.023 to 1.00 and the sum of a+b varies from 2.024 to 3.00.

The radicals represented by R'' may be, for example, alkyl radicals, such as methyl, ethyl, propyl, butyl, and octyl; aryl radicals, such as phenyl, tolyl, xylyl, and naphthyl; aralkyl radicals, such as benzyl and phenylethyl; alkenyl and cycloalkenyl radicals, such as vinyl, allyl and cyclohexenyl; cycloalkyl radicals such as cyclohexyl and cycloheptyl; halogenated radicals of the aforementioned type, such as dichloropropyl, 1,1,1-trifluoropropyl, chlorophenyl, 2,3,5,6-tetrachlorophenyl, dibromophenyl and other such radicals; and cyanoalkyl radicals such as cyanoethyl, cyanopropyl, and the like. Preferably, the radicals represented by R'' have less than 8 carbon atoms, and in particular, it is preferred that R'' be methyl, ethyl, phenyl or a chlorosubstituted phenyl. Preferably, in the above formula, a varies from 1.23 to 2.05, b varies from 0.055 to 0.92 and the sum of a plus b varies from 2.074 to 2.5.

Preparation of the organohydrogenpolysiloxanes may be carried out by any of the procedures well known to those skilled in the art.

An example of a process for producing the organohydrogenpolysiloxanes of the present invention include the following steps. In preparing an organohydrogenpolysiloxane having the structural formula:

$$(CH_3)_3SiO[(CH_3)_2SiO]_6[CH_3(H)SiO]_3Si(CH_3)_3$$

the following equilibration represented by the equation, $$MM + 6D_4 + 3MD_4'M = 4MD_6D_3'M$$

where
$M = (CH_3)_3SiO_{0.5}$
$D = (CH_3)_2SiO$ and
$D' = CH_3(H)SiO$ is performed. The equilibration takes place in the presence of 2.5 percent by weight of a catalyst, usually an acid treated clay, at about 100° C. to about 120° C. for about 5 hours. Thereafter, the catalyst is filtered off or neutralized with a weak base, and the volatile cyclics are distilled off to leave a substantially pure organohydrogenpolysiloxane.

In preparing an organohydrogenpolysiloxane containing tetrachlorophenyl groups, having the structural formula:

$$[(CH_3)_3Si]_2O[(CH_3)_2SiO]_{18}[CH_3(H)SiO]_{10}[\phi CL_4SiO_{1.5}]_{0.8}Si(CH_3)_3$$

the following equilibration represented by the equation:

$$M_3D_{25}T''_{1.13} + D_4' + MM = M_3D_{18}D_{10}'T_{0.8}''$$

where
$M = (CH_3)_3SiO_{0.5}$
$D = (CH_3)_2SiO$ $D' = CH_3(H)SiO$
$T'' = CL_4\phi SiO_{1.5}$ is performed. The equilibration takes place in the presence of the catalyst and under the conditions previously mentioned.

The polysiloxane represented by the formula $M_3D_{23}T_{1.13}''$ in the above equation is prepared by the hydrolysis of monomeric chlorosilanes containing phenyl groups or mixtures thereof with alkyl chlorosilanes carried out in the presence of an acidic material such as hydrochloric acid, sulfuric acid, phosphoric acid and the like. The silane mixture contains from about 5 to about 25 parts, by weight, of tetrachlorophenyltrichlorosilane, from about 55 to about 92 parts, by weight, of dimethyldichlorosilane, and from about 3 to about 20 parts, by weight, of trimethylchlorosilane along with from about 100 to about 600 parts of water. The polysiloxane product obtained from the foregoing may be stabilized through the addition of a stabilizing agent, for example, tin chloride, in the hydrated or unhydrated state, in amounts ranging, by weight, from one percent to ten percent based on the weight of the organopolysiloxane. The resulting mixture is then heated to about 460° F. and vacuum stripped at about 600° F. to yield the final polysiloxane product.

The allyl esters of Formula (3) are prepared by mixing an allyl acid and an alcohol. The alcohols employed in the preparation of the allyl esters have the general formula:

$$HO-(CH_2)_q-V$$

where q and V are previously described. Examples of the foregoing alcohols include alcohols having the general formula:

$$CH_3(CH_2)_qOH$$

where q is the same as previously described, such as methyl alcohol, ethyl alcohol, n-pentylalcohol, n-hexylalcohol and n-octylalcohol. The foregoing alcohols can optionally have an alkoxy group attached to the alkyl chain and include, for example, 2-methoxy pentylalcohol, 2-methoxy hexylalcohol, 3-methoxy octylalcohol, 3-ethoxy pentylalcohol, 2-ethoxy hexylalcohol and 3-ethoxy octylalcohol. Other suitable alcohols include those having the general formula:

$$CH_3O(CH_2)_qOH$$

where q is the same as previously described, such as, methoxyethyl alcohol, methoxypentylalcohol, methoxyhexylalcohol, methoxyoctyl alcohol. Glycols having the general formula:

$$HO-(CH_2)_q-(CH_2-CH_2O)_s-H$$

where q and s are previously defined, such as ethylene glycol, propylene glycol, trimethylene glycol, tetramethylene glycol, oxyethylene glycols and polyoxyethylene glycols; methoxy-oxyethylene alcohols and methoxy polyoxyethylene alcohols having the general formula:

$$HO-(CH_2)_q(OCH_2CH_2)_r-O-CH_3$$

where q and r are previously defined; oxyethylene oxypropylene glycols, polyoxyethylene polyoxypropylene glycols and combinations thereof having the general formula:

$$HO-(CH_2)_q-(CH_2CH_2O)_t-(CH_2(CH_3)CH)O)_uH$$

where q, t and u are previously defined, may also be used as the alcohols for the preparation of the allyl esters.

The allyl acids employed in the preparation of the allyl esters have the general formula:

$$CH_2=CH-(CH_2)_p-COOH$$

where p is previously defined and also include allyl acids wherein the alkyl portion of the acid can have alkyl or aryl radicals attached thereto. Examples of the allyl acids which can be used, include vinyl acetic acid, 3-butenoic acid, 5-pentenoic acid, 7-heptenoic acid, 8-octenoic acid, 10-undecenoic acid (i.e., undecylenic acid), 14-tetradecenoic acid, 20-eicosenoic acid, α-methyl-1-butenoic acid, α-methyl-1-pentenoic acid, β-methyl-1-pentenoic acid, γ-methyl-1-heptenoic acid, δ-methyl-1-heptenoic acid, α-ethyl-1-butenoic acid, α-ethyl-1-pentenoic acid, β-ethyl-1-hexenoic acid γ-propyl-1-heptenoic acid, α-phenyl-1-butenoic acid, and β-phenyl-1-pentenoic acid.

The mole ratio of allyl acid to alcohol used to form the ester preferably ranges from about 1:1 to about 1:1.5. The exact ratio is not critical and the ratio used will depend on the type of alcohol and acid employed. Usually, about a 10% excess of alcohol is added to drive the reaction to completion. In preparing the allyl ester, the allyl acid and alcohol are placed in a suitable reaction vessel along with an adequate amount of solvent, for example, toluene and a suitable catalyst. The amount of solvent present will range from about 10% to about 50% by weight of the combined weight of the acid, alcohol, solvent and catalyst employed. Preferably, about 20% by weight of toluene is used. The solvent is not necessary if an excess of alcohol is present and if the water can be conveniently removed as an azeotrope of alcohol and water. Even so, the solvent is preferred as an aid in the esterification process to keep the reaction vessel temperature within practical limits. Suitable catalysts for the reaction include, for example, p-toluene sulphonic acid, sulfuric acid, sodium bisulfate, Filtrol #20 (an acid activated clay) or trifluoroacetic acid. The amount of catalyst present by weight ranges from about 0.1% to about 2% by weight and preferably is about 0.6% by weight.

The allyl acid, alcohol, solvent catalyst mixture is brought to a reflux until the distillation of the unreacted alcohol-water azeotrope is completed. At this point, an excess amount of alcohol is added to the reaction mixture to make up the loss in alcohol due to the distillation of the azeotrope. The amount of alcohol added ranges from about 5% to about 20% of the original amount of alcohol employed. The addition of this excess alcohol drives the esterification reaction to completion. The reaction product is then neutralized with sodium bicarbonate and stripped to about 120° C. in a vacuum of 29.5 in. Hg and filtered at the pump. It is preferred that the stripping procedure occur under a vacuum to avoid polymerization of the olefin.

The following general examples illustrate the process for preparing the esters of the present invention. To prepare a methoxyethyl ester of vinyl acetic acid, 86 parts by weight of vinyl acetic acid is mixed with 76 parts by weight of methoxyethyl alcohol, about 10% excess alcohol, approximately 0.6% by weight of p-toluene sulphonic acid catalyst, and 20%, by weight of the entire mixture, of toluene. The reaction mixture is brought to a reflux to remove water by azeotropic distillation. To the reaction mixture is then added 20% of the original alcohol charge to complete esterification. The azeotropic distillation is continued until no more water is taken overhead. The reaction mixture is then neutralized with sodium bicarbonate, stripped to 120° C. at 29.5 in. Hg vacuum and filtered at the pump.

To prepare a methoxyethyl ester of undecylenic acid, the same procedure as above is followed with the exception that 184 parts by weight of undecylenic acid is used instead of vinyl acetic acid.

The reaction of the allyl ester of Formula (3) with the organohydrogenpolysiloxane of Formula (2) is carried out in the presence of conventional SiH-olefin addition catalysts, such as those elemental platinum catalysts described in U.S. Pat. No. 2,970,150—Bailey; as well as various platinum compound catalysts, such as chloroplatinic acid as described in U.S. Pat. No. 2,823,218—Speier et al.; the reaction product of chloroplatinic acid with either an alcohol, an ether or an aldehyde as described in U.S. Pat. No. 3,220,972—Lamoreaux; the platinum olefin complex catalysts as described in U.S. Pat. No. 3k159,601—Ashby; and the platinum cyclopropane complex catalyst as described in U.S. Pat. No. 3,159,662—Ashby. The amount of catalyst employed can vary within wide limits usually from $10^{-7}$ to $10^{-3}$ and preferably $10^{-5}$ to $10^{-4}$ moles of platinum as metal per mole of the allyl ester present is used. Preferably, the platinum catalyst is added to the organohydrogenpolysiloxane in the reaction chamber before the allyl ester is added.

Usually, an inert solvent is added to the organohydrogenpolysiloxane-catalyst mixture to control the SiH-allyl ester addition reaction which is exothermic. The inert solvents which can be employed include benzene, toluene, xylene, mineral spirits and the like. From about 10 percent to about 50 percent by weight of inert solvent per the entire weight reaction mixture can be employed.

The organohydrogenpolysiloxane-catalyst mixture is heated before the addition of the allyl ester to a temperature of from about 100° C. to about 125° C. to remove any free water. If a solvent, such as toluene, is used to control the exotherm, heating to 70° C., initially, is sufficient to remove any free water by toluene-water azeotrope. Once the mixture is heated the allyl ester is slowly added at a rate to maintain an exotherm at a temperature of from about 100° C. to about 125° C. during the reaction. If a solvent has been added to the organohydrogenpolysiloxane-catalyst mixture, the allyl ester is added at a rate which maintains an exotherm at the reflux temperature of the solvent.

The amount of allyl ester added to the reaction mixture is that amount required to react with the SiH-containing organohydrogenpolysiloxane. The allyl ester is added in a mole ratio of about 1:1 and preferably a slight excess of the allyl ester, ranging from about 5% to about 10%, based on the mole ratio, is added. This results in the conversion of each siloxane unit reacted, from an organohydrogensiloxane unit to a siloxane unit containing one silicon-bonded organic radical and one silicon-bonded ester radical.

Following addition of the allyl ester to the reaction mixture, an additional amount of catalyst is preferably added, and the mixture is heated at a temperature ranging from about 120° C. to about 150° C. to insure completeness of the reaction. Usually, one-half of the amount of catalyst initially added is employed. If a solvent has been used, the reaction mixture is heated at the reflux temperature of such solvent. In general, the heating should take about 1 hour; however, this can be longer depending upon the purity of the allyl ester and the amount of rearrangement the allyl ester undergoes. The heating time will be determined by checking a sample of the reaction mixture for SiH bonds by infrared analysis. If SiH bonds are present, infrared analysis will show a band located between 4.4 and 4.8μ (wavelength). When at least 95% of the organohydrogenpolysiloxane has been converted to the reaction product, the reaction mixture may be considered to have proceeded to a sufficient extent for the conversion to the ester functional organopolysiloxane.

Once it has been determined that the reaction has sufficiently proceeded to completion, the reaction mixture is stripped at about 150° C. in a vacuum of about 29.2 in. Hg to remove solvents and low boiling fractions. Other stripping conditions well known to those skilled in the art can be used to remove solvents and low boiling fractions. The stripped product is then cooked with charcoal at about 100° C., cooled and filtered at the pump with activated carbon, bone charcoal, Fuller's Earth, Celite 545 and the like.

The ester functional organopolysiloxanes of the present invention can contain various additives to improve their ability to function as lubricants. Illustrations of such additives include, dioctyltetrachlorophthalate, dibutyltindisulphide, octyl acid phosphate, butyl stearate and zinc dialkyldithiophosphate.

In order that those skilled in the art will be better able to practice the invention, the following examples are given by way of illustration and are not to be construed as limiting the claimed invention.

EXAMPLE 1

To a properly equipped reaction flask was added 90 gms of an organohydrogenpolysiloxane fluid having the average structural formula:

$(CH_3)_3SiO[(CH_3)_2SiO]_6[CH_3(H)SiO]_3Si(CH_3)_3$, 100 gm of toluene and 0.1 ml of Lamoreaux catalyst. The solution was heated to 120° C. to remove any free water as an alcohol-water azeotrope. Once the solution was dried by way of the azeotrope, 80 gm of methoxyethyl vinylacetic acid ester, $CH_2=CH-CH_2-C(O)O-CH_2CH_2-O-CH_3$ was slowly added to the mixture at the reflux temperature (approximately 110° C.). Following the addition of the ester, 0.05 ml of Lamoreaux catalyst was added to the reaction system which was then heated at 120° C. for 2 hours (approximately three times the ester feed time). The product was stripped to 150° C. in a vacuum of 29.7 in. Hg, cooked with charcoal at 100° C. for 15 minutes, cooled and filtered at the pump with Celite 545. The final product had the average structural formula:

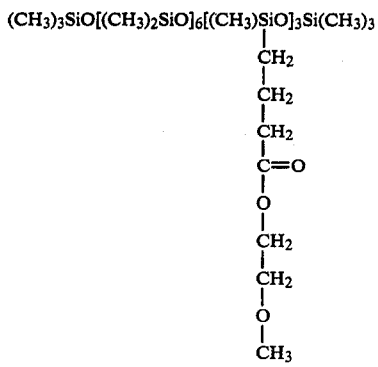

EXAMPLE 2

The procedure as outlined in Example 1 was followed with the exception that a methoxyethyl undecylenic acid ester, $CH_2=CH(CH_2)_8C(O)O-CH_2CH_2-O-CH_3$, was substituted for the methoxyethyl undecylenic acid ester, $CH_2=CH-CH_2-C(O)O-CH_2CH_2-O-CH_3$, yielding an ester functional organopolysiloxane fluid having the average structure formula:

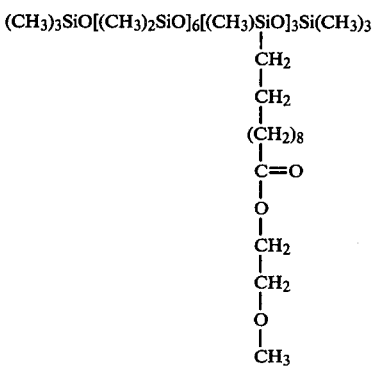

EXAMPLE 3

To a properly equipped reaction flask was added 293 gm of a tetrachlorophenyl-substituted-organopolysiloxane fluid having the average structural formula: $[(CH_3)_3Si]_2O[(CH_3)_2SiO]_{18}[CH_3(H)SiO]_{10}[\phi CL\text{-}4Si(O)_{1.5}]_{0.8}Si(CH_3)_3$, 200 gm of toluene and 0.1 ml of Lamoreaux catalyst. The solution was heated to 120° C. to remove any free water as an alcohol-water azeotrope. Once the solution was dried by way of the azeotrope, 157.5 gm of methoxyethyl vinylacetic acid ester, $CH_2=CH-CH_2-C(O)O-CH_2CH_2-O-CH_3$, was slowly added to the mixture at the reflux temperature (approximately 120° C.). Following the addition of the ester, 0.05 ml of a Lamoreaux catalyst was added to the reaction system which was then heated at 120° C. for 2 hours (approximately three times the ester feed time). The product was stripped to 150° C. in a vacuum of 29.2 in. Hg, cooked with charcoal at 100° C. for 15 minutes, cooled and filtered at the pump with Celite 545. The product had the average structural formula:

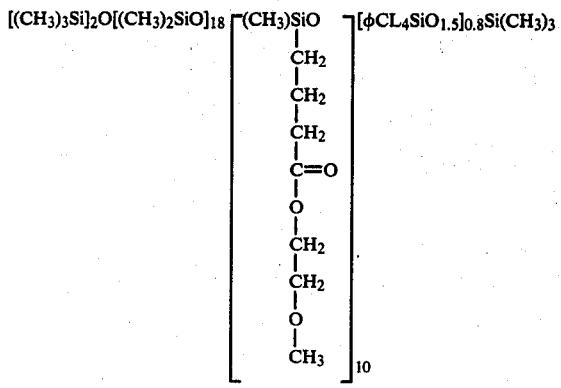

EXAMPLE 4

The procedure as outlined in Example 3 was followed with the exception that the methoxyethyl vinyl acetic acid ester, $CH_2=CH-CH_2-C(O)O-CH_2CH_2-O-CH_3$, was replaced with a methoxyethyl undecylenic acid ester, $CH_2=CH(CH_2)_8C(O)O-CH_2-CH_2-O-CH_3$, yielding an ester functional tetrachlorophenyl organopolysiloxane fluid having the average structural formula:

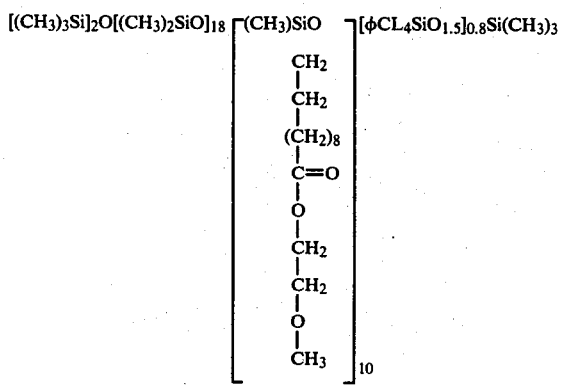

The lubricating characteristics of the ester functional organopolysiloxane fluids prepared in Examples 1-4 were evaluated with a Four Ball Wear Tester (Brown-GE Modification) built by the Roxana Machine Works to determine the wear scar. The better the lubricity of a fluid, the lower the wear scar. The testing device consists of three steel balls, each about one-half inch in diameter, clamped securely in non-rotating fashion in a cup with a fourth ball mounted in a rotatable chuck and adapted to spin in the cavity formed by the three adjacent balls. A loading arm is utilized to force the cup containing the balls against the chuck, the load being varied in any manner desired. Provision is made for holding the lubricant to be tested in the cup containing the balls so that the latter are continually immersed in the lubricant. In testing a lubricant, the chuck and top ball are rotated for a given period of time at a particular number of revolutions per minute under a fixed load. After the test run is completed, the lower or fixed balls are examined with a microscope, and the size of the scar worn in them by the upper rotating ball is noted and taken as a measure of the comparative lubricating quality under the particular set of conditions. The average diameter of the generally circular scar is used.

In one test the four ester functional polysiloxane fluids prepared in Examples 1-4 were compared with a methyl alkyl polysiloxane lubricating fluid manufactured and sold by the General Electric Company under the trademark SF-1147, a polydimethyldiphenyl siloxane fluid manufactured and sold by the General Electric Company under the trademark SF-1154, and a chlorophenylmethyl siloxane lubricating fluid manufactured and sold by the General Electric Company under the trademark F-50. For purposes of brevity, the ester functional organopolysiloxane fluids of Examples 1-4 will be designated as follows:

Example 1: $C_3$ Ester
Example 2: $C_{11}$ Ester
Example 3: $C_3$ Ester ($\phi CL_4$)
Example 4: $C_{11}$ Ester ($\phi CL_4$)

The above fluids were tested at a 50 kg load, at a speed of 600 RPM, at ambient temperature, for one hour, using 52-100 steel balls in the Wear Tester.

The test results as illustrated in Table 1 below show that the ester functional organopolysiloxane fluids have lubricating properties equivalent to lubricants presently being employed. Superior lubricating characteristics are obtained when using the methoxyethyl undecylenic acid ester instead of the methoxyethyl vinyl acetic acid ester indicating that as the carbon chain on the ester increases, the lubricity of the resulting polysiloxane fluid increases. The lubricating properties of these fluids also increase with the addition of tetrachlorophenyl groups to the polysiloxane chain.

TABLE 1

| Fluid | Wear Scar, mm. |
|---|---|
| $C_3$ Ester | >2.5 |
| $C_{11}$ Ester | 0.8 |
| $C_3$ Ester ($\phi CL_4$) | 2.7 |
| $C_{11}$ Ester ($\phi CL_4$) | 0.7 |
| SF-1147 | 0.6 |
| F-50 | 0.5 |
| SF-1154 | 4.2 |

In a second test, under the same conditions outlined above, the ester functional organopolysiloxane of Example 1 was compared with and without various additives that are employed to improve the lubricating characteristics of fluids. The test results as illustrated in Table 2 below show that some of the additives tested can be employed to improve the lubricating properties of the ester functional organopolysiloxanes of the present invention.

TABLE 2

| FLUID | ADDITIVE | WEAR SCAR mm. |
|---|---|---|
| $C_3$ Ester | 1% dioctyltetrachlorophthalate | 2.39 |
| $C_3$ Ester | 1% dibutyltindisulphide | 2.62 |
| $C_3$ Ester | 1% octyl acid phosphate | 2.35 |
| $C_3$ Ester | 1% butyl stearate | 2.33 |
| $C_3$ Ester | 1% zinc dialkyldithiophosphate | 2.95 |
| $C_3$ Ester | ½% butyl stearate | 1.89 |

In a third test, the ester functional organopolysiloxane fluids prepared in Examples 1, 3 and 4 were tested under a 30 kg load, at a speed of 600 RPM, at ambient temperature, for one hour, using soft steel balls in the Wear Tester. Various additives were also incorporated into the above fluids tested under such conditions. The test results as illustrated in Table 3 below, show that the ester functional organopolysiloxane fluids do not perform as well at the 30 Kg load as they do at the 50 Kg load. However, the lubricating characteristics of such fluids can be improved through the addition of additives.

TABLE 3

| FLUID | ADDITIVE | WEAR SCAR mm. |
|---|---|---|
| $C_{11}$ Ester | None | >1 |
| $C_{11}$ Ester ($\phi CL_4$) | None | 1.75 |
| $C_{11}$ Ester | 1% octyl acid phosphate 1% dibutyltindisulphide | 1.28 |
| $C_{11}$ Ester ($\phi CL_4$) | ½% octyl acid phosphate ½% dibutyltindisulphide 1% zinc dialkyldithiophosphate | 0.62 |
| $C_3$ Ester | 1% octyl acid phosphate 1% dibutyltindisulphide 1% dioctyltetrachlorophthalate | 2.72 |
| $C_3$ Ester | ½% butyl stearate ½% zinc dialkyldithiophosphate | >1 |
| $C_3$ Ester | 1.6% zinc dialkyldithiophosphate | 2.5 |

In a fourth test, the ester functional polysiloxane fluids prepared in Examples 1 and 4 were tested under a 10 Kg load, at a speed of 600 RPM, at ambient temperature, for one hour, using soft steel balls in the Wear Tester. Various additives were also incorporated into the above fluids tested under such conditions. The test results as illustrated in Table 4 below show that the methoxyethyl vinyl acetic acid ester functional organopolysiloxane fluids have superior lubricating characteristics at the 10 Kg load than at the 50 Kg or 30 Kg load. The lubricating characteristic of such fluid can also be improved at the 10 Kg load through the incorporation of various additives. With respect to the methoxyethyl undecylenic acid ester functional organopolysiloxane fluid employed such fluid performs as well at the 10 Kg load as the 50 Kg load.

TABLE 4

| FLUID | ADDITIVE | WEAR SCAR mm. |
|---|---|---|
| $C_3$ Ester | None | 2.38 |
| $C_3$ Ester | 1% zinc dialkyldithiophosphate | 2.06 |
| $C_3$ Ester | 1% octyl acid phosphate | 1.66 |
| $C_3$ Ester | 1% butyl stearate | 2.10 |
| $C_{11}$ Ester ($\phi CL_4$) | None | 0.73 |

While other modifications of the invention and variations thereof which may be employed within the scope of the invention have not been described, the invention is intended to include such modifications as may be embraced within the appended claims.

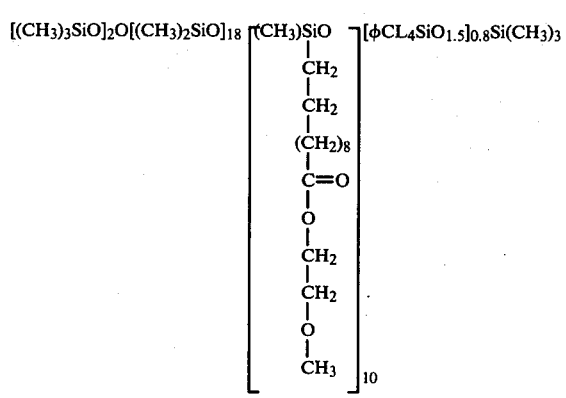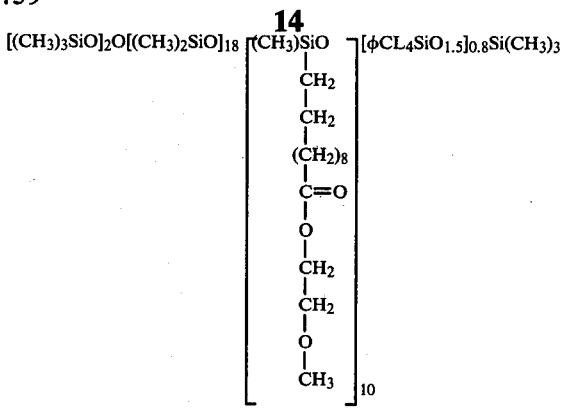

What is claimed is:

1. An ester functional organopolysiloxane lubricant composition having the general formula:

$$(CH_3)_3SiO[R_2SiO]_x[(Q)SiR]_y[R'SiO_{1.5}]_zSi(CH_3)_3$$

where R and R' are selected from the group consisting of monovalent hydrocarbon radicals, halogenated monovalent hydrocarbon radicals and cyanoalkyl radicals, x has a value of from 0 to about 110, y has a value of from about 1 to 100, z has a value of from about 0.8 to about 5, and Q is an ester radical represented by the general formula:

$$-CH_2-CH_2-(CH_2)_p-C(O)O-V$$

where the alkyl portion of the ester radical which bonds the C(O)O group to the organopolysiloxane chain comprises a straight chain or branched chain, said branched chain having alkyl or aryl radicals attached thereto, p has a value of from 1 to about 30 and V is selected from the group consisting of $$-(CH_2)_q-(OCH_2CH_2)_r-O-CH_3 \quad (a)$$

where r has a value of from 1 to about 10, $$-(CH_2)_q-O-CH_3, \quad (b)$$

$$-CH_3, \quad (c)$$

$$-(CH_2)_q-CH_3, \quad (d)$$

where the alkyl group modified by q in the above ester radical comprises a straight chain or a branched chain, said branched chain having an alkoxy group attached thereto, and where q has a value of from 1 to about 10, $$-(CH_2-CH_2-O)_s-H \quad (e)$$

where s has a value of from 1 to about 30, and $$-(CH_2-CH_2-O)_t-(CH_2(CH_3)C(H)O)_uH \quad (f)$$

where t and u have a value of from 1 to about 20.

2. A composition in accordance with claim 1, wherein R and R' have less than 8 carbon atoms.

3. A composition in accordance with claim 1, wherein R is selected from the group consisting of methyl and ethyl.

4. A composition in accordance with claim 1, wherein R' is selected from the group consisting of phenyl and a chloro-substituted phenyl.

5. A composition in accordance with claim 1, wherein the alkyl portion of the ester radical which bonds the C(O)O group to the organopolysiloxane chain is a straight chain, p has a value of 8, q has a value of 2 and V is methoxy.

6. An ester functional organopolysiloxane lubricant composition having the average structural formula:

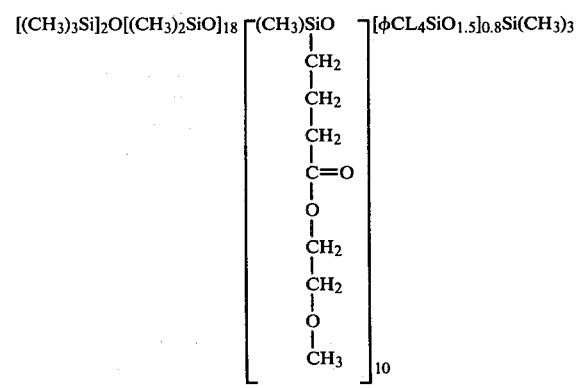

7. An ester functional organopolysiloxane lubricant composition having the average structural formula: